United States Patent
Bartholomä et al.

(10) Patent No.: US 6,376,766 B1
(45) Date of Patent: Apr. 23, 2002

(54) MOUNTING FOR OBLONG STRUCTURES WITH AN ELECTRICAL SHIELDING

(75) Inventors: Mario Bartholomä, Winden; Fritz Zügel, Waldkirch; Volker Götz, Kenzingen; Jürgen Adolf, Denzlingen, all of (DE)

(73) Assignee: Anton Hummel Verwaltungs GmbH, Waldkirch (DE)

( * ) Notice: Subject to any disclaimer, the term of this patent is extended or adjusted under 35 U.S.C. 154(b) by 0 days.

(21) Appl. No.: 09/309,708

(22) Filed: May 11, 1999

(30) Foreign Application Priority Data

Jun. 3, 1998 (DE) .......................... 198 24 808

(51) Int. Cl.⁷ .......................... H05K 9/00; H02G 3/18; H01R 13/648
(52) U.S. Cl. ............ 174/35 C; 174/35 R; 174/65 R; 439/98
(58) Field of Search .................. 439/578, 583, 439/584, 95, 96, 271, 607, 98; 174/65 R, 35 C, 35 R, 65 SS, 65 G, 75 C, 74 R, 88 C, 102 R

(56) References Cited

U.S. PATENT DOCUMENTS

| | | | | |
|---|---|---|---|---|
| 3,537,065 A | * | 10/1970 | Winston | 339/177 |
| 3,963,320 A | * | 6/1976 | Spinner | 339/177 R |
| 4,447,107 A | * | 5/1984 | Major, Jr. | 339/171 |
| 5,315,684 A | * | 5/1994 | Szegda | 385/139 |
| 5,371,819 A | * | 12/1994 | Szegda | 385/75 |
| 5,456,611 A | * | 10/1995 | Henry et al. | 439/180 |
| 5,456,614 A | * | 10/1995 | Szegda | 439/321 |
| 6,089,912 A | * | 7/2000 | Tallis et al. | 439/584 |

FOREIGN PATENT DOCUMENTS

| | | |
|---|---|---|
| DE | 1 765 795 | 8/1971 |
| DE | GM 74 34 418 | 2/1975 |
| DE | GM 85 36 122.4 | 5/1987 |
| EP | 0 780 924 A2 | 6/1997 |

* cited by examiner

Primary Examiner—Dean A. Reichard
Assistant Examiner—Carmelo Oliva
(74) Attorney, Agent, or Firm—Akin, Gump, Strauss, Hauer & Feld, L.L.P.

(57) ABSTRACT

A mounting (1) designed for oblong structures such as cables (2), hoses or the like, which have an electrical shielding sheath (4), that contains in the usage position of an electrically conducting insert (6) that has a clamping finger (8) and creates an electrical connection between the shielding sheath (4) and the mounting (1) is provided. The mounting (1), under certain circumstances merely a wall opening or the like, possibly however also a complete cable screw connection with strain relief for the oblong structure—has a receptacle opening (7) for the insertion and guiding through of the oblong structure or cable (2) and especially also for the reception of the electrically conducting insert (6), which for its part has a mounting ring (9) and clamping fingers (8) that project from it in the axial direction. On the outer side of the electrically conducting clamping fingers (8) which function for the contact, a projection (10) extends radially outwardly, at a distance from the free ends (8a) of the clamping fingers (8), which function as a contact position, and at a distance from the mounting ring (9) respectively. Through the projection (10), the clamping fingers (8) are bent or swung inwardly during the insertion into a correspondingly narrow receptacle opening (7) by an amount corresponding to the dimension of these projections (10) and the receptacle opening (8), and thus make a secure contact on the oblong structure. (FIG. 6)

14 Claims, 3 Drawing Sheets

MOUNTING FOR OBLONG STRUCTURES WITH AN ELECTRICAL SHIELDING

BACKGROUND OF THE INVENTION

The invention involves a mounting for oblong structures such as cables, hoses, or the like, which have an electrical shielding and are, in the usage position—if necessary, after a removal of the shielding by stripping the insulation—in electrical connection with the mounting via an electrically conducting insert that has a clamping finger, where the mounting has a receptacle opening for inserting or guiding through the oblong structure and for receiving the electrically conducting insert, and this insert has a mounting ring with axially spaced apart clamping fingers.

A similar arrangement or mounting of this type is known from the patent DE-OS 17 65 795. The clamping fingers of the spring-insert are, in this known solution, deformed by a conical area of a mounting sheath and by an axial movement, radially to the inside against the shielding sheath. The quality of the contact and the pressing force of the respective clamping finger on the shielding sheath is thus a function of the length of the axial movement and the cone angle as well as the length of the clamping fingers. If a screw connection necessary in this case for the axial adjustment can for some reason not be performed with a sufficiently large axial adjustment movement over a sufficiently large axial length, a good contact result is jeopardized or not even present.

A similar arrangement is known from the patent DE-GM 74 34 418. In this, the clamping fingers running approximately coaxially on their inside have a conical shape that tapers from their starting position towards their open end and the entire insert must be shoved, for an axial adjustment of the cable and a mounting that grasps it, in the axial direction into a constriction, such that in turn the clamping fingers because of their conical outer shape are deformed in the radial direction against the electrical shielding sheath and are pressed against it. Thus, also in this case, the quality of the contact is a function of the axial adjustment and the cone angle, i.e. also in this case, a relatively large axial adjustment is necessary in order to generate a sufficiently good contact.

SUMMARY OF THE INVENTION

Therefore, the object of the invention is to create a mounting of the type named at the beginning in which a secure contact between the oblong structure and its shielding sheath and the insert that has the clamping fingers, can be achieved independently of an axial movement, when the insert is located in its mounting position.

In order to achieve this purpose, it is provided that on the outer side of the clamping fingers functioning for the contact, at a distance from their open ends which function as a contact position, and at a distance from the mounting ring, at least one projection is respectively arranged, such that the projections, in the relaxed position—i.e. when the insert is located, for example, outside of the reception opening of the mounting, extend up to a sheath circle or sheath cylinder that has a diameter that is larger than the corresponding dimension of the inner cross-section of the receptacle opening of the mounting, and that the projections are supported, when an insert is inserted into the reception opening, on the wall of the reception opening under the restoring force of the radially inwardly bent clamping fingers in this usage position. In this way, it can be achieved that when introducing this insert or spring insert into the receptacle opening of the mounting, the outside projections cause a corresponding swinging and bending, radially inwardly of the clamping and contact fingers that are carried by the mounting ring, such that the free ends of these clamping fingers are also swung inwardly to the furthest possible extent, independently of any cone surface or an axial extension of some movement. It is sufficient to bring the area provided with the projections into the receptacle opening of the mounting, in order to achieve the specified swinging of the clamping fingers by a dimension determined in advance—independent of the size of the projections and their position relative to the ends of the clamping fingers. Thus, a very simple mounting results with a desired predetermined approach of the open contact ends of the clamping or contact fingers to the shielding sheath or the contact position, so that it is already possible beforehand to coordinate the radial dimension of the projections on the one hand, and their distance from the ends of the contact fingers on the other hand, to the cross-sectional dimension of the respective oblong structure and the desired pressing force.

It is expedient when the clamping fingers are uninterrupted or continuous below their projections. Thus, the force exerted on the clamping finger by the projection when inserting it into the receptacle opening is also practically completely transferred to the clamping finger.

A good force transfer from the projections to the clamping fingers results when the projections are massive on the clamping fingers or consist of a solid material with them, i.e. at the position of the projections, the clamping fingers are thickened around them in their respective cross-section. In this way, it can even be better prevented that the projections themselves possibly deform when the insert and the contact finger are introduced into the receptacle opening. Furthermore, in this way, the stability of the clamping fingers is increased.

The separation distance of the outside projections of the clamping fingers from the mounting ring can be smaller than the separation distance of the projections from the free ends of the clamping fingers. The free ends are bent correspondingly further radially inwardly when the projections come into the receptacle opening.

For example, the separation distance of the projections from the free ends of the clamping fingers can be approximately ¾ to ⅘ of the entire length of the clamping finger extending out from the mounting ring. An additional practical dimension can consist in that the radial extension of the projections to the outside of the clamping fingers amounts to the radial thickness or size of these clamping or contact fingers. By the combination of such dimensions, the radial inwards movement of the open ends of the clamping fingers can be predetermined to a desired dimension, so that the contact pressure is also influenced by it, when an oblong structure runs between these clamping or contact fingers. At the same time, the force necessary for swinging or bending can be influenced by these dimensions and limited to a tolerable size.

For a mounting of the insert into a receptacle opening of the mounting, which is as easy and smooth-running as possible, it is expedient the transition from the outside of the clamping fingers to the projection, or at least the edge of the respective projection which is facing the open end of the respective clamping finger, is beveled such that the axial extension of the projection from the clamping finger decreases in the radial direction toward the outside. The projections can thus have a sloping surface that increases to their largest radial extension and that makes it easier to introduce the insert into the receptacle opening so that this introduction movement functions for the radial inward swinging of the clamping fingers.

The sloping surface increasing to the largest radial expansion of the projection can thereby be linear in cross-section and/or curved in a convex or concave manner. Thus, a certain transition can be provided for the introduction movement into the receptacle opening.

The clamping fingers can be arranged in the undeformed starting position—i.e. outside of the receptacle opening of the mounting—approximately cylindrically and in particular have a bend on their inside corresponding to the surface of this imaginary cylinder. In this way, a good fit is simultaneously possible on an oblong structure that is as a rule cylindrical, for example, a cable that has been stripped of its insulation or the like, having the largest possible positioning surface.

It is, however, also or additionally possible, that the ends of the clamping fingers separate from each other at least in the undeformed starting position, forming a lead-in funnel. This makes easier the insertion of the oblong structure from the open end of the clamping fingers, in particular, also even before the insertion into the actual mounting and its receptacle opening. Along with that, the insertion of the oblong structure from the mounting is, of course, possible in the same way and also in the pre-mounted position.

The mounting ring can extend beyond the projections in the radial direction. This is especially advantageous for the attachment of the insert using this mounting ring.

For example, the mounting ring can have a stopper and/or a catch projection or latching connection for axially attaching onto the edge or in the inside of the receptacle opening. This allows a simple insertion of the clamping or contact insert and expedient clipping into a corresponding groove that can receive the latching connection or catch projection.

The insert can be manufactured in an especially cost-effective manner when the insert consisting of clamping fingers and mounting ring is constructed as a single piece.

An additional embodiment is possible in making it such that this electrically conducting insert consists of an electrically conducting synthetic material or out of a synthetic material that is provided at least on the surface locally with an electrically conducting layer, for example, out of metallized synthetic material or synthetic material that is coated or vapor deposited with metal and/or with synthetic material provided with metal inlays projecting from it. This makes possible the manufacture of the contact insert in the injection molding process practically in one work step. Furthermore, this material has the advantage of creating a gentle positioning on the electrical shielding sheath of a cable or hose and ruling out, to the greatest extent possible, any damages to this shielding sheath under larger pressure forces and possible relative movements between the clamping fingers and the cable or hose.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

In the description of the various embodiments, parts that are the same or are similar in terms of their function, or even holes or the like, are given the same reference numbers throughout the different embodiment designs.

Figure 1:
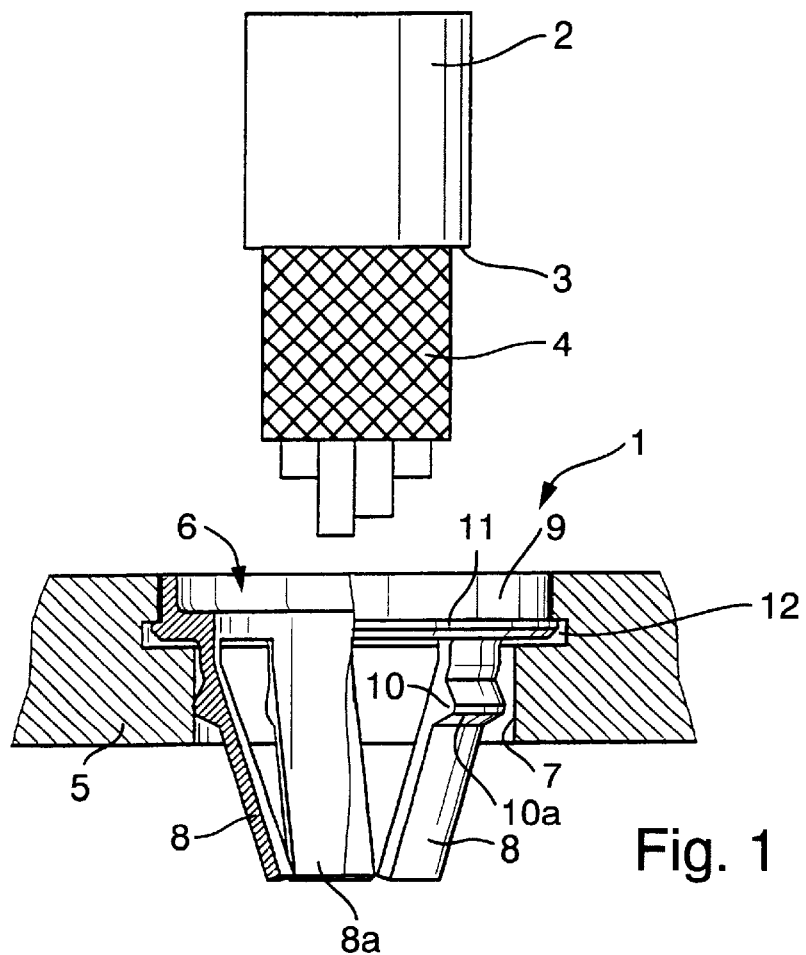
FIG. 1 is a view, partially in cross-section of a mounting for an oblong structure shaped as a cable with an electrical shielding sheath locally uncovered by stripping, formed by a wall with a receptacle opening and a mounting inserted in it, having clamping fingers that are deformed radially inwardly by insertion, before the oblong structure is inserted.
Figure 2:
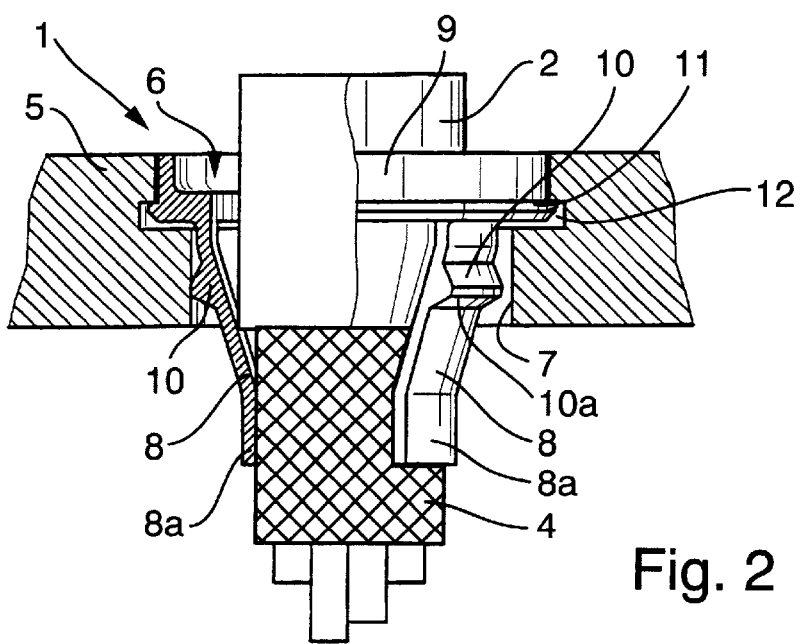
FIG. 2 is a view corresponding to FIG. 1 after the insertion of the oblong structure into the mounting and between the clamping fingers that are bent back again locally in the process and come into contact in this way with the electrical shielding sheath.

A mounting for oblong structures indicated on the whole by 1, which in the illustrated embodiment is a cable 2, which has an electrical shielding sheath 4 under an external insulation 3, is in the embodiment according to FIGS. 1 and 2 formed by a wall 5 and an insert to be described in greater detail and indicated on the whole by 6, which fits into a corresponding receptacle opening 7 of this one essential part of the wall 5 that forms the mounting 1.

Figure 5:
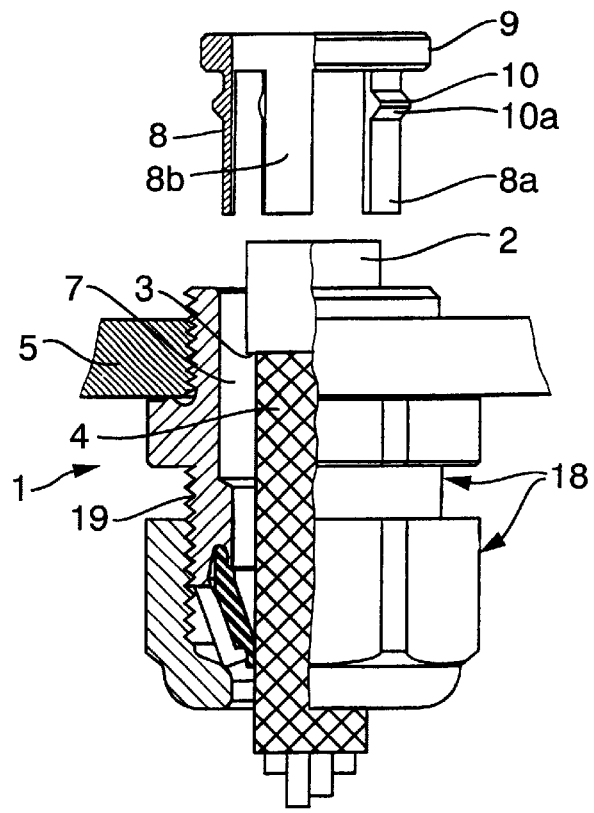
FIG. 5 is a longitudinal section of a modified embodiment form in which the mounting is constructed as a cable screw connection that has a mounting sheath and union nut, as well as a clamping insert, and that causes strain relief on the oblong structure, and in which the mounting is inserted before the electrically conducting insert in the usage position.
Figure 6:
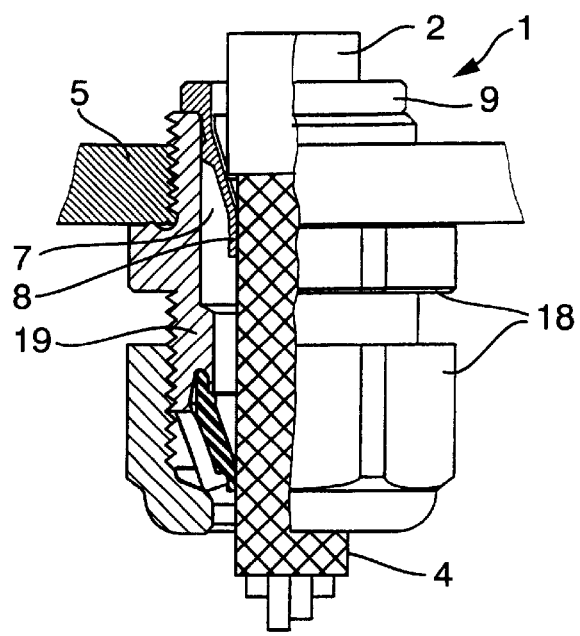
FIG. 6 is a view according to FIG. 5 after the introduction of the insert into the corresponding receptacle opening of the sheath of the cable screw connection that belongs to the mounting.

In the embodiment example according to FIGS. 5 and 6, the mounting 1 is formed by a cable screw connection indicated on the whole by 18, which is screwed into a corresponding through opening of a wall 5 with a mounting sheath 19 in a known way, where this mounting sheath 19 of the cable screw connection 18 has the receptacle opening 7 for the electrically conducting insert 6 in this embodiment.

The various embodiments of the mountings 1 for the cable 2 or also another oblong structure, for example, a hose, thus have each time the electrically conducting insert 6 in common, which has the clamping finger 8 that generate an electrically conductive connection between this electrically conductive insert 6 and the electrical shielding 4 in the usage position. Moreover, in these various embodiments it is provided that the electrically conducting insert 6 is inserted respectively into the receptacle opening 7 constructed somewhat differently under certain circumstances, for the introduction and guiding through of the oblong structure or cable 2, where the insert 6 has in all of the embodiments a mounting ring 9 and clamping fingers 8 that project from it in the axial direction, such that these clamping fingers 8 all project out from the mounting ring 9 to the same side in the usage position, and in the non-mounted relaxed position, are arranged according to FIGS. 4 and 5 parallel to each other and coaxially to the mounting ring 9.

Figure 4:
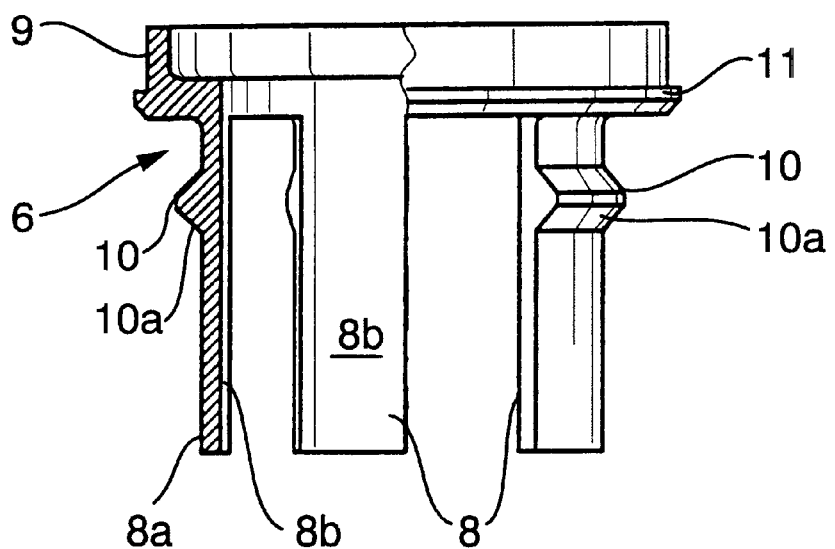
FIG. 4 is a side view shown partially in longitudinal section of the insert having the clamping fingers, before it is inserted into the receptacle opening of the mounting.

Especially in FIG. 4, but also in FIGS. 1, 2, 5, and 6 it is depicted that on the outside of the clamping fingers 8 functioning to create the contact, at a distance from their free ends 8a that function as contact points and at a distance from the mounting ring 6, a projection 10 is respectively arranged, where each time depending on the application, possibly even several of these types of projections 10 could be provided, whether next to each other or behind each other.

In the embodiments being discussed, however, each projection 10 extends respectively over the entire width of the clamping finger 8 so that several projections 10 next to each other on one clamping finger 8 are not possible.

Especially by FIGS. 4 and 5 it is clear that the projections 10 of the clamping fingers 8 in the relaxed position, i.e. when the insert 6 or the clamping fingers 8 are located outside of the receptacle opening 7, extend up to a sheath circle or sheath cylinder that is not depicted and is hypothetical, having a diameter that is larger than the corresponding dimension of the inside cross section of the receptacle opening 7 of the mounting 1, or larger than the diameter of this receptacle opening 7, which causes that during the attaching of the insert 6 and especially of the area of the clamping finger 8, which has the projections 10, into the receptacle opening 7, the clamping fingers 8 are swung or bent, in the manner shown especially in FIG. 1, but also in FIG. 6, radially inwardly since from now on, the projections 10 and especially their largest dimension are supported after this insertion into the receptacle opening 7, on the inside wall of the receptacle opening 7 of the mounting 1 under the restoring force of the clamping fingers 8 bent radially inwardly in this usage position. If after that or even prior to that, the cable 2 with the stripped area is inserted into this insert 6 and between the clamping fingers 8, the fingers are bent back again somewhat in the area of their ends 8a opposing the inwards bending, thus they lie over a certain area on the outside of the electric shielding sheath 4 and make a correspondingly good contact, as shown in FIGS. 2 and 6. In an advantageous way, this inward deformation of the clamping fingers 8 and their pressing onto the shielding sheath 4 is suitably independent of any sort of axial displacements of union nuts or the like, since the radial deformation of the clamping fingers 8 is determined exclusively through the receptacle opening 7 and the dimension of the projections 10, so that thus this radial deformation of the clamping fingers 8 is always the same for pressing onto the electrical shielding sheath 4 of a cable 2 after the mounting or attachment of the insert 6 and is independent of any sort of screw connection operations during the assembly.

From FIG. 4 it will be recognized that the clamping fingers 8 are uninterrupted or continuous below the projections 10, thus the projections are not themselves formed by any sort of directional changes of the clamping fingers. Thus, the projections 10 are stable and capable of resistance and can perform the desired deformation of the clamping fingers 8 without any noteworthy self-deformation during insertion of the insert 6 into the receptacle opening 7. In this manner, which is shown in all embodiments the projections 10 are massive on the clamping fingers 8, i.e. consist of solid material and thus the clamping fingers 8 have a correspondingly thick cross-section at the site of the projections 10. The fact that the clamping fingers 8 have projections 10 projecting radially outwardly can thus also be further formulated in this embodiment in that the clamping fingers 8 have a cross-section thickened radially in a short area set at a distance from the mounting ring 6 and from its free end 8a.

So that the bending of the clamping finger 8 in the radial direction is as large as possible, but simultaneously does not get too severe, several dimensions are arranged:

The distance of the outside projections 10 of the clamping fingers 8 from the mounting ring 6 is smaller than the distance of the projections 10 from the respective free ends 8a of the clamping fingers 8. In this way, the separation distance of the projections 10 from the free ends 8a of the clamping fingers 8 amounts to approximately ¾ to ⅘ of the total length of the clamping fingers 8 extending out from the mounting ring 6.

The radial extension of the projections 10 outward from the respective clamping fingers 8 corresponds approximately to the radial thickness or size of the clamping fingers 8 or amounts, according to the embodiment, to somewhat more than this thickness.

The transition of the outside of the clamping fingers 8 to the respective projection 10 or at least the edge 10a of the respective projection 10 facing the free end 8a of the respective clamping finger 8 is sloped in the sense that the axial extension of the projection 10 is reduced from the clamping finger 8 in the radial direction outward. Thus, it is clearly recognized that the sloping surface or edge 10a increasing to the largest radial extension of the projection 10 runs linearly in cross-section. It could, however, also be curved at least locally in a convex or concave manner.

All of these measures contribute to the clamping fingers 8 being bent radially inwardly by the simple introduction of the insert 6 and its mounting ring 9 into the corresponding receptacle opening 7, so that the free ends 8a of the clamping fingers can be pressed onto an electrical shielding 4 of a cable 2 or another oblong structure, and can make a good contact with it. For this, of course, it is significant that the insert 6 and its components as well as the mounting are electrically conducting in order to make a corresponding electrical connection.

Figure 3:
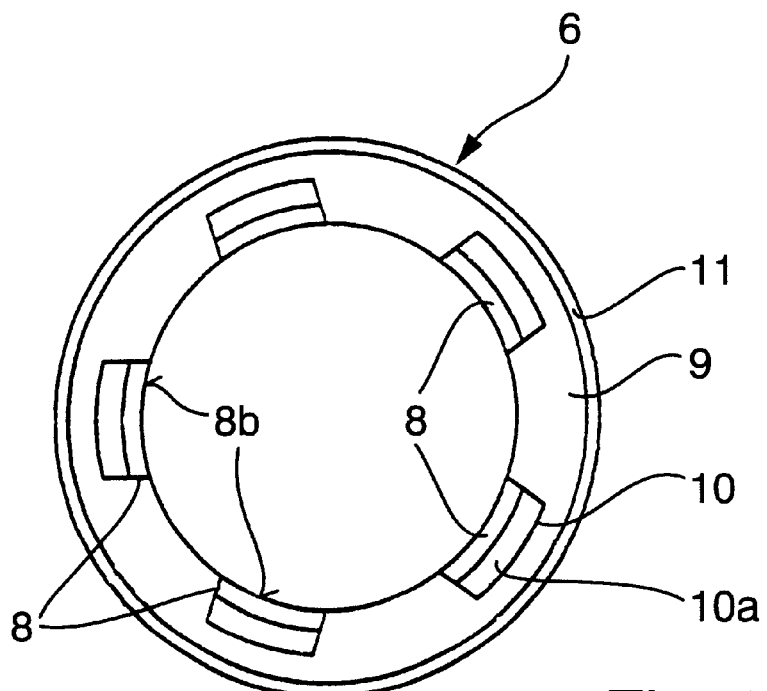
FIG. 3 is a front view.

Especially from FIG. 3 it will be recognized that the clamping fingers 8 and in particular, their inner sides in the undeformed starting position are arranged approximately on an—imaginary—cylinder and in particular, on their inside 8b, have a curvature that corresponds to the surface of this imaginary cylinder. Accordingly, they can be correspondingly well and extensively pressed onto a cylindrical oblong structure such as a cable 2.

From FIGS. 3 and 4 as well as from the additional figures, it can in addition be recognized that the mounting ring 9 extends beyond the projections 10 in the radial direction. By this it is possible that the mounting ring 9 according to the embodiment of FIGS. 5 and 6 forms a stopper for the axial attachment on the edge of the receptacle opening 7 or a catch projection or clip-in connection 11 for the axial attachment to the inside of the receptacle opening 7 and a ring groove 12 provided therein. It would also be conceivable to provide a ring groove 12 of this type in the mounting sheath 19 of the mounting ring 6 in the form of a cable screw connection 18 according to FIGS. 5 and 6.

In all of the embodiments it is provided that the insert 6 including the clamping fingers 8 and the mounting ring 9 is constructed as a single piece and preferably is created from an electrically conducting synthetic material, such that it is also possible that the insert 6 is made of a synthetic material provided with-an electrically conducting layer at least locally at least on the surface. For example, a synthetic material that is metallized or coated or vapor-deposited with metal can be utilized, or metal inlays are provided in the synthetic material that forms the insert 6. All of these measures, through which the insert 6 is made to be electrically conducting, can also be combined, if desired.

The mounting 1 is designed as desired for oblong structures such as cables 2, hoses or the like, which have an electrical shielding 4, and contains in the usage position an electrically conducting insert 6 that has a clamping finger 8 and creates an electrical connection between the shielding 4 and the mounting 1. The mounting 1, under certain circumstances merely a wall opening or the like, possibly however also a complete cable screw connection with strain relief for the oblong structure—has a receptacle opening 7 for the insertion and guiding through of the oblong structure or cable 2 and especially also for the reception of the electrically conducting insert 6, which for its part has a mounting ring 9 and clamping fingers 8 that project from it in the axial direction. On the outer side of the electrically conducting clamping fingers 8 which provide contact, a projection 10 extends radially outwardly and is located at a distance from the open ends 8a of the clamping fingers 8, which function as a contact position, and at a distance from the mounting ring 9 respectively. Through the projection 10, the clamping fingers 8 are bent or swung inwardly during the insertion into a correspondingly narrow receptacle opening 7 by an amount corresponding to the dimension of these projections 10 and the receptacle opening 8, and thus make a secure contact on the oblong structure.

What is claimed is:

1. A mounting arrangement (1) for an oblong structure which has an electrical shielding (4) and is connected in a usage position using an electrically conductive insert (6) that has electrically conductive clamping fingers (8) and is in electrical connection with a mounting surface, where the mounting surface has a generally cylindrical receptacle opening (7) for insertion and guiding through of the oblong structure and for receiving the electrically conducting insert (6), the electrically conducting insert comprising a mounting ring (9) having the electrically conductive clamping fingers (8) projecting from the mounting ring in an axial direction, the electrically conductive clamping fingers having outer sides that function to create a contact, at least one projection (10) that functions as a contact point between the clamping fingers and an inside wall of the receptacle opening is arranged at a first distance from a free end (8a) of the clamping fingers (8), and at a second distance from the mounting ring (9) respectively, the first distance being greater than the second distance, the at least one projection (10) of the clamping fingers (8) extend in a relaxed position of the insert (6) radially outwardly to a diameter that is larger than a corresponding dimension of an inner cross section of the receptacle opening (7) of the mounting arrangement (1), and the at least one projection is supported on the inside wall of the receptacle opening (7) of the mounting arrangement (1) under a restoring force of the clamping fingers (8), which are bent radially inwardly in a usage position in which the insert is inserted in the receptacle opening (7).

2. Mounting arrangement according to claim 1, wherein the clamping fingers (8) are straight underneath the at least one projection (10).

3. Mounting arrangement according to claim 1, wherein the at least one projection (10) on the clamping fingers (8) comprises a solid material formed from a thickened portion in a respective cross section of the clamping fingers (8) at the at least one projection.

4. Mounting arrangement according to claim 1, wherein each of the at least one projection (10) extends respectively over an entire width of the clamping fingers (8).

5. Mounting arrangement according to claim 1, wherein the separation distance of the at least one projection (10) from the free ends (8a) of the clamping fingers (8) is approximately three-fourths to four-fifths of the entire length of the clamping fingers (8) extending from the mounting ring (9).

6. Mounting arrangement according to claim 1, wherein a radial outward extension of the at least one projection (10) is approximately equal to a radial thickness of the clamping fingers (8).

7. Mounting arrangement according to claim 1, wherein a transition is provided from an outer side of the clamping fingers (8) to an edge of the at least one projection (10) or at least an edge (10a) of the at least one projection (10) facing towards the free ends (8a) of the respective clamping fingers (8), the transition is sloped such that an axial extension of the at least one projection (10) from the clamping fingers (8) decreases in the radial direction outwardly.

8. Mounting arrangement according to claim 7, wherein a sloped surface of the transition which extends to a largest radial expansion of the at least one projection (10) is one of linear in cross-section or curved in a convex or concave manner.

9. Mounting arrangement according to claim 1, wherein the clamping fingers (8) are arranged in an undeformed starting position approximately cylindrically and on an inner side (8b), have a curvature corresponding to a surface of an imaginary cylinder.

10. Mounting arrangement according to claim 1, wherein at least the free ends of the clamping fingers are set apart from each other in an undeformed starting position, forming a lead-in funnel.

11. Mounting arrangement according to claim 1, wherein the mounting ring extends radially beyond the at least one projection (10).

12. Mounting arrangement according to claim 1, wherein the mounting ring (9) has at least one of a stopper, a catch projection, and clip-in connection (11) for axial attachment on an edge or in an inside of the receptacle opening (7).

13. Mounting arrangement according to claim 1, wherein the insert (6) comprising the clamping fingers (8) and the mounting ring (9) is constructed as a single piece.

14. Mounting arrangement according to one claim 1, wherein the electrically conducting insert (6) is made of at least one of an electrically conducting synthetic material and a synthetic material that is provided with an electrically conducting layer at least locally on a surface of the conducting insert, the electrically conducting layer formed from at least one of a metallized synthetic material, a synthetic material that is coated or vapor-deposited with metal, and metal inlays.

* * * * *